United States Patent

Bortinger

[11] Patent Number: 5,922,637
[45] Date of Patent: Jul. 13, 1999

[54] PHOSPHORUS/VANADIUM CATALYST PREPARATION

[75] Inventor: Arie Bortinger, Ridgewood, N.J.

[73] Assignee: Scientific Design Company, Inc., Little Ferry, N.J.

[21] Appl. No.: 09/004,886

[22] Filed: Jan. 9, 1998

Related U.S. Application Data

[63] Continuation-in-part of application No. 08/828,456, Mar. 28, 1997, abandoned.

[51] Int. Cl.$^6$ .......................... B01J 27/198; B01J 27/199
[52] U.S. Cl. ............................................. 502/209; 502/353
[58] Field of Search ..................................... 502/353, 209

[56] References Cited

U.S. PATENT DOCUMENTS

| | | |
|---|---|---|
| 4,517,371 | 5/1985 | Yang et al. . |
| 5,137,860 | 8/1992 | Ebner et al. . |
| 5,296,436 | 3/1994 | Bortinger . |
| 5,364,824 | 11/1994 | Andrews et al. . |

OTHER PUBLICATIONS

Tabita et al. "Incorporation of promoter elements etc." Applied Catalysis A:General, 103 (1993) pp. 281–290.

*Primary Examiner*—Elizabeth D. Wood
*Attorney, Agent, or Firm*—William C. Long

[57] ABSTRACT

The invention provides an improved method for the production of vanadium/phosphorous mixed oxide catalysts, a vanadium +5 solid compound first being digested in an organic solvent at anhydrous conditions, water then being added and the resulting aqueous mixture containing suspended solid vanadium compound being digested to form the catalyst precursor.

3 Claims, No Drawings

PHOSPHORUS/VANADIUM CATALYST PREPARATION

RELATED APPLICATION

This application is a continuation-in-part of application Ser. No. 08/828,456 filed Mar. 28, 1997 and now abandoned.

BACKGROUND OF THE INVENTION

1. Field of the Invention

The present invention relates to an improved method for the production of vanadium/phosphorus mixed oxide catalysts where a catalyst precursor is formed by a sequential procedure in which a solid phase vanadium +5 compound such as $V_2O_5$ is suspended in an organic solvent and digested under reflux in the presence of phosphoric acid under anhydrous conditions for a certain period, and thereafter water is added to the suspension of solid in solvent and the resulting mixture is further digested under reflux to complete the catalyst precursor formation; the catalyst after activation has special utility in the production of maleic anhydride.

DESCRIPTION OF THE PRIOR ART

A great deal of work has been done in the preparation and use of vanadium phosphorus oxide catalysts for the production of maleic anhydride. See U.S. Pat. Nos. 5,137,860 and 5,364,824 for a comprehensive description of the efforts of prior workers in this area.

Efforts have been made to develop catalyst preparation procedures which do not involve the use of corrosive and hazardous reagents such as HCl and oxalic acid.

U.S. Pat. No. 4,517,371 for example, at column 4, lines 48–64 summarizes prior work as follows:

"Generalizing from the above discussion, conventional preoperative methods, including both the aqueous and organic solution techniques, are unsatisfactory in that:
(1) they usually require that the catalyst manufacturing equipment be fabricated of special corrosion-resistant materials of construction;
(2) they are troubled by serious waste-disposal problems arising out of the employment of hydrogen chloride, nitric acid or oxalic acid for the dissolution of the vanadium component;
(3) they generally require extended and complex procedures for activation of the precursor catalyst;
(4) the preparation of the precursor catalyst is generally complicated and inherently costly; and
(5) the aqueous-based preparations result in catalysts of relatively poor activity and yield for converting butane to maleic anhydride."

The process provided by U.S. Pat. No. 4,517,371 is described at column 5, lines 18–43 as follows:

"In one aspect of the present invention there is provided a process for preparing a composition comprising vanadium, phosphorus and oxygen capable of catalyzing the oxidation of hydrocarbons comprising:
1. reacting a vanadium containing compound and a phosphorus containing compound in the presence of a liquid organic media in a manner and under conditions sufficient to form in said liquid organic media a heterogeneous vanadium-phosphorus-oxygen first catalyst precursor composition having an atomic ratio of phosphorus to vanadium of from about 0.5:1 to about 2:1, and an average vanadium valence of from about 3.9 to about 4.7;
2. separating said first catalyst precursor composition with from said liquid organic media;
3. contacting said first catalyst precursor composition with at least one part by weight water per part by weight first catalyst precursor composition at a temperature of at least 30° C. to form a second vanadium-phosphorus-oxygen catalyst precursor composition;
4. separating said second catalyst precursor composition from said water; and
5. activating said second catalyst precursor composition."

Takita et al in an article entitled "Incorporation of promoter elements into the crystal lattice of $(VO)_2P_2O_7$ and its promotion effects on the oxidation of n-butane to maleic anhydride", Applied Catalysis A: General, Vol 103, pages 281–290 (1993) describe preparing a homogeneous solution of reduced and dissolved $V_2O_5$ in isobutanol by adding $V_2O_5$ to isobutanol and refluxing for 10 hours, then adding 99% $H_3PO_4$. A solution of metal acetoacetonates in isobutanol was added and reflux continued for 1 hour. A small amount of water was added and a precipitate was formed and separated.

The present invention provides a still further improved process for the preparation of VPO catalysts having special utility in the oxidation of $C_4$ hydrocarbons to form maleic anhydride.

BRIEF SUMMARY OF THE INVENTION

In accordance with the invention, a mixed vanadium/phosphorus oxide catalyst suitable for the production of maleic anhydride is prepared by a sequential process wherein a vanadium +5 compound such as $V_2O_5$ is first digested under reflux as a solid suspension in an anhydrous organic solvent solution in the presence of phosphoric acid; after this first digestion period, water is added to the suspension of solid vanadium compound in organic solvent and the resulting admixture is further digested under reflux to complete formation of the crystalline VPO catalyst precursor. The precursor is then separated such as by filtration and activated to form a highly active and selective catalyst for maleic anhydride production.

DETAILED DESCRIPTION

The various materials used in the preparation of the catalyst are generally known. Thus, although $V_2O_5$ is the preferred vanadium starting material, various other vanadium compounds can be employed as is known in the art.

Similarly, phosphorous compounds employed to provide the phosphorous component are known. Especially preferred are the anhydrous phosphoric acid compounds such as orthophosphoric acid, polyphosphoric acid which is available as a mixture of orthophosphoric acid with pyrophosphoric acid, triphosphoric and higher acids and is sold on the basis of its calculated content of $H_3PO_4$, as for example 115%. Superphosphoric acid is a similar mixture sold as 105% $H_3PO_4$. The phosphorus component is employed in amount to provide a P:V atomic ratio of 1.0–1.3/1.

The organic liquid media used is likewise of a known type and functions as a suspending agent for the vanadium compound, as a solvent and/or diluent for the phosphorous compound, as a reducing agent for the vanadium compound and as a suspending agent for the formed catalyst precursor. A comprehensive listing is provided in U.S. Pat. No. 4,517,371, preferred in practice of this invention is the combination of isobutanol and benzyl alcohol, the benzyl alcohol comprising at least 5 vol % and less that 30 vol % of the combination.

Promoters of the type and in amounts known in this art can be employed. The relative amounts of vanadium compound, phosphorous compound and promoters employed are well known in the art.

Critical to practice of the invention is the sequence by which the catalyst precursor is prepared. First in the preparation sequence is the addition of the solid vanadium compound, eg. $V_2O_5$, and phosphorus compound to anhydrous organic solvent media and digestion at reflux conditions of the resulting suspension under anhydrous conditions for 1 to 24 hours. During this anhydrous digestion period, the vanadium compound is maintained in the solid phase and undergoes reduction to a vanadium valence of about 3.9 to about 4.4. The phosphorous component is added at the beginning of this digestion period as are any promoter compounds. Preferably, the digestion is carried out by refluxing the mixture at essentially atmospheric conditions for the desired time. During the digestion at reflux conditions, such water as is formed is removed as by use of a Dean Stark separator in order to maintain anhydrous conditions.

The amount of organic solvent which is employed during the first digestion is less than 15 ml solvent per gram of added $V_2O_5$ in order than the vanadium component be maintained primarily in the solid phase throughout the digestion.

After this first digestion period, water is added to the organic solvent mixture in an amount of about 0.05 to about 2 gram mols water per gram atom of V contained in the mixture and digestion is continued at reflux for an additional 1 to 24 hours. Throughout the entire digestion period the vanadium compound is maintained essentially in the solid phase.

It can be seen that this procedure is quite different from that of U.S. Pat. No. 4,517,371 which teaches anhydrous formation of a first catalyst precursor, separation of this first precursor from organics as by filtration, and digestion of the separated precursor in water to form a second catalyst precursor which is recovered and activated. Likewise, the procedure differs from that described in the Takita et al article above cited wherein water is added to the homogeneous solution of the dissolved vanadium compound to precipitate the solids from this solution.

In the procedure of the invention, after the anhydrous digestion, water is added to the solvent suspension and the digestion of the suspended solid vanadium compound is continued to form the final catalyst precursor.

The catalyst precursor is conveniently represented by a formula such as $VP_aMe_yO_x$, 'a' being 1.0 to 1.3. Me is a metal such as Zn or Mo, an alkali metal or alkaline earth metal as known in the art as modifiers for catalysts of this type. This representation is not an empirical formula and has no significance other than representing the atom ratio of the components of the catalyst. The 'x' and 'y' in fact, have no determinant value and can vary widely depending on the combinations within the complex. That there is oxygen present is known, and the $O_x$ is representative of this. Although the VPO precursor has been identified as $VOHPO_4 \cdot 0.5H_2O$, it is unclear as to the exact structure of the metal promoters in the presence of the excess phosphorus and therefore the above representation is a useful one.

After completion of the digestion, it is useful to concentrate the solid catalyst precursor by stripping off solvent and then recovering the precursor solid by filtration. The recovered solid is advantageously washed with organic solvent, eg. isobutanol, and the final removal of organics from the precursor is carried out in a drying step in an oven at a temperature in the range of 100 to 180° C. for 1–24 hours. Lower temperatures and longer times can be used. Reduced pressure can also be applied to lower oven temperatures. Following drying, calcination of the dried catalyst precursor is carried out at a temperature in the range of about 200 to 300° for a sufficient period to improve the catalytic properties of the composition and remove volatile materials, usually 1–15 hours.

Following calcination, the catalyst precursor is activated by known procedures. This activation takes place at 350–550° C., for about 1–10 hours and results in the formation of catalyst which can then be used in the production of maleic anhydride. Where the catalyst is ultimately to be used in the form of pellets in a fixed bed reactor, the catalyst precursor after drying and calcining can be formed into the final pellets and then activated or the precursor after drying and calcining can first be activated and then formed into pellets.

The following examples are illustrative:

Example 1

Into a 12 liter round flask equipped with a mechanical stirrer, a gas inlet tube, thermowell, Dean Stark trap with a condenser and a heating mantle were charged 5640 ml anhydrous isobutanol, 564 ml benzyl alcohol, 627 grams $V_2O_5$ of about 1 micron in particle size, 7.03 grams lithium acetate dihydrate, 36.32 grams zinc acetylacetonate hydrate and 17.67 grams of 12-molybdophosphoric acid. The reaction mixture was heated to 77° C. in about 1 hour and then cooled to 30° C. About 810.8 g of 100% phosphoric acid were added slowly while stirring into the reaction mixture.

The reaction mixture of solids suspended in solvent was brought to reflux which was continued for 3 hours during which time the vanadium compound remained in the solid phase. Through use of the Dean Stark trap, such water as was formed during the digestion was separated with the organic solvent returned to the reaction flask. Thereafter, 62 g deionized water was added and reflux was resumed for about 16 hours during which time both solvent and water were returned to the reaction flask. At the end of this period, about 2500 ml distillate were removed by distillation and the reaction mixture was cooled down and filtered. The product cake was washed with about 700 cc of fresh IBA. The product was then dried in the oven at 100° C. for 4 hours, 110° C. for 10 hours and finally at 150° C. for 16 hours. The dry cake was then crushed and calcined at 260° C. for 3 hours. The calcined powder was mixed with 3% graphite and was formed into 3/16"×3/16" tablets with a 1/16" I.D hole struck therethrough. The catalyst in the pellet form was than activated in an oven with 75% steam/25% air at about 425° C. for 1 hour followed by 6 hours in which the air was replaced with nitrogen. The catalytic activity is shown in Table 1.

The performance test is done in a 5 foot stainless steel reactor tube, 1 inch O.D. packed with a 3.5 feet catalyst bed. Air in the feed is balanced with the % butane used in the reaction to a total of 100%.

Comparative Example 2

The synthesis of example 1 was generally repeated except that water was not added after the first reflux step. The catalytic activity is shown in Table 1.

TABLE 1[(1)]

EVALUATION OF CATALYSTS PREPARED WITH HCL FREE SYNTHESIS

| EXAMPLE | 1 | 2 |
|---|---|---|
| HOURS | 1024 | 1024 |
| SALT °C. | 390 | 385 |
| HOT SPOT °C. | 441 | 458 |
| % BUTANE | 1.31 | 1.30 |
| % CONVERSION | 80.7 | 80.8 |
| % SELECTIVITY | 69.8 | 66.6 |
| WT % YIELD | 95.0 | 90.8 |

[(1)]1" × 5' Reactor; 3.5' bed with thermowell; 3/16" × 3/16" with 1/16" hole in center; ghsv WAS 2500 hr$^{-1}$.

The experimental results shown in Table 1 demonstrate the excellent results obtained through use of catalysts prepared in accordance with the invention over extended periods of operation. As compared to similar catalyst prepared without the digestion with added water, catalysts prepared according to the invention had a lower hot spot temperature and exhibited substantially superior selectivities and yields in the production of maleic anhydride.

What is claimed is:

1. In a process for the preparation of a V/P/O catalyst useful for the production of maleic anhydride wherein a solid pentavalent vanadium compound suspended in organic solvent is reduced, the improvement which comprises first reducing the solid pentavalent vanadium compound by reflux in the presence of added phosphorous compound for 1 to 24 hours in anhydrous organic solution followed by addition of about 0.05 to 2 gram mols of water per gram atom of V to the organic solvent containing suspension of reduced vanadium compound and digestion of the solid vanadium compound in the presence of the added water by reflux for 1 to 24 hours the vanadium compound remaining essentially in the solid phase throughout.

2. The process of claim 1 wherein the pentavalent vanadium compound is $V_2O_5$.

3. The process of claim 1 wherein lithium, zinc, and/or molybdenum promoters are incorporated in the catalyst.

* * * * *